United States Patent [19]
Wheeler

[11] 3,907,953
[45] Sept. 23, 1975

[54] CONTAINER CLOSURE AND METHOD

[75] Inventor: William R. Wheeler, Richmond, Ind.

[73] Assignee: Aluminum Company of America, Pittsburgh, Pa.

[22] Filed: Dec. 18, 1972

[21] Appl. No.: 316,418

[52] U.S. Cl. ............... 264/54; 23/230 A; 23/253 A; 215/348; 260/2.5 E; 260/2.5 P; 264/51
[51] Int. Cl.² ...................... B29H 7/20; B65D 53/00
[58] Field of Search ........ 264/51, 54, 48; 260/2.5 E, 260/2.5 P; 23/230 A, 253 A

[56] References Cited
UNITED STATES PATENTS

| | | | |
|---|---|---|---|
| 2,256,483 | 9/1941 | Johnston | 260/2.5 E |
| 2,389,761 | 11/1945 | Burgeni | 215/48 |
| 3,026,273 | 3/1962 | Engles | 260/2.5 E |
| 3,031,267 | 4/1962 | Martin et al. | 23/230 A |
| 3,432,452 | 3/1969 | Hersh et al. | 260/2.5 P |
| 3,433,700 | 3/1969 | Migdol et al. | 260/2.5 P |
| 3,444,281 | 5/1969 | Cahill et al. | 260/2.5 P |
| 3,507,708 | 4/1970 | Vignaud | 220/44 A |
| 3,536,796 | 10/1970 | Rock | 260/2.5 P |
| 3,536,797 | 10/1970 | Cowan et al. | 264/48 |
| 3,558,753 | 1/1971 | Edlin | 264/54 |
| 3,576,686 | 4/1971 | Schmidle et al. | 260/2.5 P |
| 3,676,378 | 7/1972 | Heil et al. | 260/2.5 E |
| 3,721,253 | 3/1973 | Remke | 23/230 A |

*Primary Examiner*—Ronald W. Griffin
*Attorney, Agent, or Firm*—Daniel A. Sullivan, Jr.

[57] ABSTRACT

A method for producing a foamed plastic product suitable as liner material for container closures, including the steps of extruding a polymer composition foamable at atmospheric pressure into an air space at atmospheric pressure and then into a liquid quenching agent for stopping foaming and for setting, wiping against the quenched composition, and maintaining the residence time of the composition in the air space as a function of bubbling from the composition during the wiping.

Also a container closure having a gas impermeable shell and a polyvinyl chloride foam liner of a density of 0.67 to 0.72 grams per cubic centimeter in the shell.

2 Claims, 7 Drawing Figures

3,907,953

CONTAINER CLOSURE AND METHOD

BACKGROUND OF THE INVENTION

The present invention relates to a container closure and to a method for producing a liner material for use as a part of a container closure.

U.S. Pat. No. 3,335,897 of Anthony J. Castro discloses a container closure having a plastic material foamed in situ in a venting orifice. Gases may move through the foamed material and through the orifice but liquids are blocked due to the hydrophobic nature of the foamed material. The prior art is lacking in a method of providing foamed plastics material having the right combination of liquid blocking and gas permeable properties.

SUMMARY OF THE INVENTION

In view of the above, it is an object of the present invention to provide a method for producing a foamed plastics product suitable as liner material for container closures which product exhibits reliably a combination of properties suitable for venting gases while blocking liquids.

It is a further object of the present invention to provide a container closure having a liner with a combination of properties ideally suited for permitting gases to pass therethrough while blocking liquids.

These as well as other objects, which will become apparent in the discussion that follows, are achieved according to the present invention by a method including the steps of extruding a polymer composition foamable at atmospheric pressure into an air space at atmospheric pressure and then into a liquid quenching agent for stopping foaming and for setting, wiping against the quenched composition, and maintaining the residence time of the composition in the air space as a function of bubbling from the composition during the wiping; and by a container closure having a gas impermeable shell and a polyvinyl chloride foam linear of a density of 0.67 to 0.72 grams per cubic centimeter in the shell.

According to this invention, a polyvinyl chloride foam liner of a density in a range of 0.67 to 0.72 grams per cubic centimeter is used as a liner in a container closure to seal a container on which the closure is secured but allow any internal gas pressure to vent through the liner to the outside. The container is prevented from bursting or losing its sealing action against contained fluids. Such polyvinyl chloride foam also may work as a pressure equalizer by allowing outside air into a plastic bottle to prevent its collapse due to an internal vacuum.

The method of the present invention enables the mass production of foamed polymer composition in an open cell gasket structure that allows two-way venting of gases but seals to liquids with wide viscosity ranges. The process step of wiping against quenched foamed polymer composition in a quenching liquid will cause the emission of bubbles when the proper combination of gas releasing and liquid blocking properties are present in the quenched foamed polymer composition. The appearance of bubbling is used to regulate the residence time of the polymer composition in an air space where it undergoes foaming. If no bubbling is occurring, this indicates that a closed pore structure unsatisfactory for container venting is being obtained, and the residence time in the air space may be increased until bubbling does occur to indicate a required open pore structure. The proper amount of bubbling may be calibrated by measuring the density of the foamed product. It has been found that operators of the process of the invention quickly come to recognize the proper bubbling so that a high uniformity and reliability of properties in the resulting foamed product is obtained during mass production.

DESCRIPTION OF THE PREFERRED EMBODIMENTS

Figure 1:
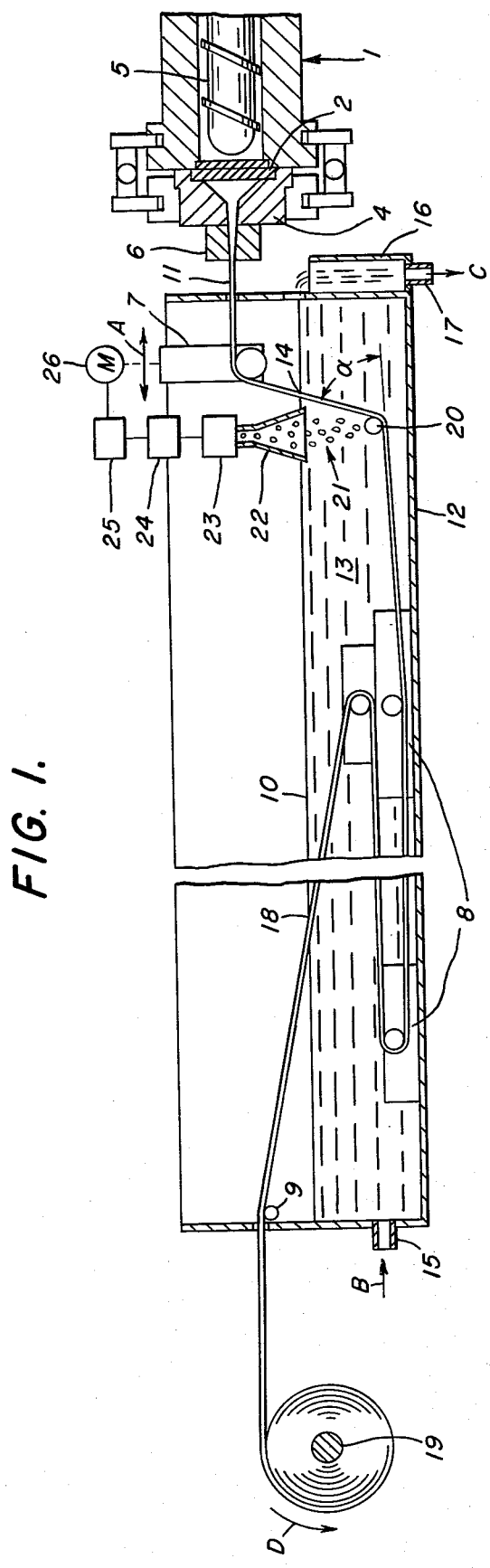
FIG. 1 is a sectional, elevational view of apparatus used in the method of the present invention.

Referring firstly to FIG. 1, a polymer composition foamable at atmospheric pressure is extruded from extruder 1 through strainer plate 2, die adapter 4, and die 6. The extrudate 11 moves, while in the process of foaming, over a roller mechanism 7 which is mounted adjustably in the directions of double arrow A on tank 12. The residence time of the extrudate in the air is the time during which foaming proceeds and is adjustable by moving roller mechanism 7 back and forth in the direction of arrow A. Residence time is computed on the basis of the path length of the extrudate in the air and the velocity of the extrudate. The extrudate 11 leaves the air space between die 6 and water bath 13 by passing into the water bath 13 at point 14 in the surface of the water. The quenching action of the water bath stops the foaming in the extrudate and sets its plastic material.

Water flows into the tank 12 at connection 15 in the direction of arrow B and out of tank 12 into overflow 16 and through outlet 17 in the direction of arrow C. Water flow is thus counter to the direction of movement of extrudate 11.

Depending upon the speed with which the extrudate moves, i.e. for increased production rates, reversing rollers 8 may be used to increase the path length of the extrudate in the water bath.

Extrudate 11 leaves the water bath at a point 18 in the surface 10 of the water and moves over an air wipe bar 9 which dries the extrudate by a squeegeeing action and by blowing air onto the extrudate.

Finally the extrudate is wound up on winding mechanism 19 which rotates in the direction of arrow D. The rotational speed of the winding mechanism is controlled to provide the desired drawdown of the extrudate from its originally extruded cross sectional dimensions to the desired final cross sectional dimensions and to provide tension in the extrudate along its length from the outlet of die 6 through bath 13 to winding mechanism 19.

Extending transversely across the bath 13 from the sides of tank 12 is a cylindrical bar 20 mounted either rotatably or fixedly in the sides of tank 12. Bar 20, made for example of polished stainless steel, wipes against the extrudate 11. Air or gas bubbles 21 released from the extrudate 11 indicate an open cell structure desired when the extrudate is to be used as liner material for a venting container closure. It has been found that the same air bubble release occurs whether or not bar 20 rotates, for instance with tangential velocity equal to extrudate velocity during wiping.

If the residence time of extrudate 11 in the air space between the outlet of die 6 and point 14 is too short, foaming does not progress to the extent necessary to permit the use of the extrudate product as venting liner material. This situation is rendered readily apparent, because no bubbles 21 are caused by the wiping of bar 20 against the extrudate. If no bubbles are appearing, the machine operator moves roller mechanism 7 to the left in FIG. 1 until the resulting increase in the length of the path of the extrudate in the air space between the outlet of die 6 and a point 14 in the surface 10 of the water bath permits sufficient additional foaming action to occur so that bubbling does result at wiper bar 20.

A calibration of the bubbling may be made by checking the density of the extrudate. Test strips of 10-inch length may be cut from the extrudate between bar 9 and winding mechanism 19. These strips are rolled, with their length as the rolling axis, and held in rolled-up form by tape. One-inch intervals are marked off along the lengths of the rolls. The rolls are then allowed to immerse as far as they will in water contained in a graduated flask. Density is read by the number of inches of roll immersed in water.

It has been found that a machine operator quickly comes to recognize the characteristics of the bubbling 21 associated with the density range of 0.67 to 0.72, preferably 0.70, of the foamed polyvinyl chloride of the present invention; this is one of the surprising and beneficial features of the present invention. It will be recognized, however, that the gas emitted at wiper bar 20 may be collected in a hood 22 immersed in the water bath and run through a flowmeter 23. The flow rate is transduced to an electric signal in transducer 24, the output signal from transducer 24 then being compared with a signal indicative of desired density in comparator 25, and deviations from the preset electrical signal used to operate a motor 26 to move roller mechanism 7 in the directions of arrow A. Nevertheless, an outstanding feature of the process of the present invention is that it enables a machine operator, simply by visual observation of bubbling 21, to obtain a foamed container liner venting product having properties of high uniformity and reliability.

The foamed polyvinyl chloride of density between 0.67 and 0.72 obtained in the method of the present invention comes out foamed in a semi-porous state. The porosity of this polyvinyl chloride is sensitive to changes in gas pressures and allows vapor to migrate therethrough to the low pressure side of a sealing surface. The foamed cells within the polyvinyl chloride are of a size which prevents liquids from passing through unless a container is perhaps subjected to undue or abnormal abuse.

Figure 2:
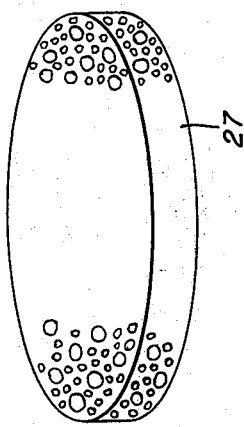
FIG. 2 is a perspective view of a liner according to the present invention.

The extrudate 11 is in the form of ribbon and desired shapes of liner material may be sheared from the resulting ribbon material. FIG. 2 shows a liner disc 27 which has been previously sheared from such a ribbon. Both its top and bottom sealing surfaces are porous (have an open cell structure) and only thin membranes surround the cells (pores or voids). Some of these membranes may be perforated.

Figure 3A:
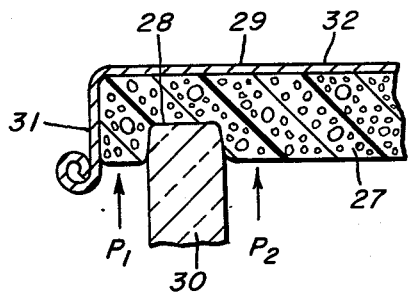
FIGS. 3a to 3c are broken-out, sectional, elevational views of a closure according to the invention in place on a container.

FIG. 3a shows in cross section a sealed surface 28 located at the mouth of a glass container 30. Sealing is effected by gas impermeable shell 29 and liner disc 27 arranged contiguously to the shell. Shell 29 abuts against the liner disc and compresses the liner disc against container 30 and its surface 28 by the crimping action of its shell skirt 31 depending from its shell end wall 32. Since vapor or gases are released through liner 27, equilibrium of pressure between the interior and exterior of the container is maintained, i.e. $P_1 = P_2$ and the gas phase remains in equilibrium between the internal and external areas of the container.

Figure 3B:
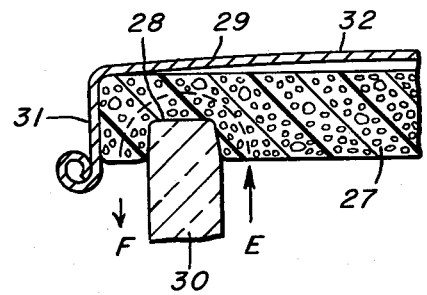

FIG. 3b shows in cross section a container where the internal pressure has increased (because of oxidation or some other chemical action, physical heating, or by the physical squeezing of the container) and has caused the gas impermeable closure shell 29 to dome slightly, thus deflecting it centrally a small distance upward from liner 27. Vapor or gas flows through and across the liner above sealing surface 28 along the flow path indicated by the dashed lines between arrows E and F from the higher pressure area within the container to the lower pressure area outside.

Figure 3C:
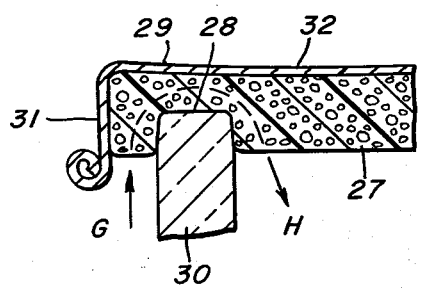

FIG. 3c shows a cross section of a container where the internal pressure has decreased, for instance due to cooling of previously loaded contents. Shell 29 has deflected centrally downwards against the foam. Again, gas pressure is equalized by a gas flow from the higher to the lower pressure area, this time gas flow is between arrows G and H into the container through liner 27 across the top of sealing surface 28.

Due to the properties of liner material 27, the pressure with which the closure shell 29 presses liner 27 againsts sealing surface 28, i.e. for instance screw cap application torque, can be reduced considerably while yet maintaining an effective seal against escape of liquid contents within the container. For the liner material of the specific example below and a 28 millimeter diameter cap, twist-on torques up to 22 inch-pounds still give adequate venting. In practice, a twist-off torque of 15 inch-pounds is aimed for, and obtained twist-off torques between 8 or 9 and 22 inch-pounds provide both adequate sealing and venting properties. In the case of the liner material of the specific example below, it has been found that the twist-off torque is roughly equal to the twist-on torque.

It is to be noted that even though the liner 27 is compressed and restricted immediately above the glass sealing area 28, capillary caverns nevertheless allow gas or vapor phase to pass through the liner after a screw cap has been torqued sufficiently to prevent liquid escape at the interface between liner material 27 and glass bottle 30.

It has been discovered that liquid begins to be permitted to escape through the liner material of the present invention if the material has a density less than the lower preferred density limit of 0.67 grams per cubic centimeter. Exceeding of the upper density value of 0.72 grams per cubic centimeter leads to an inadequate venting of gases, although higher densities may be useful for sealing against the degasification of carbonated beverages.

Figure 4:
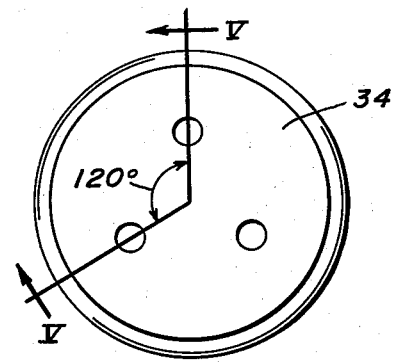
FIG. 4 is a top view of the shell of the container closure of FIG. 5.
Figure 5:
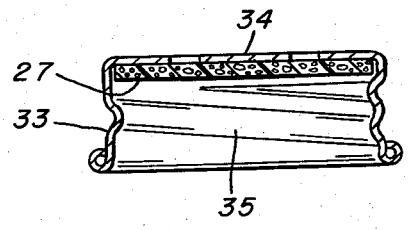
FIG. 5 is a sectional view taken on the cutting plane V—V in FIG. 4.

Referring to FIGS. 4 and 5, there is shown a container closure including a skirt 33 depending from an end wall section 34. The end wall contains three holes spaced 120° apart around its center. This particular closure has screw threads 35 which allow it to be screwed onto a threaded container mouth to bring liner disc 27 into sealing engagement with the container. The skirt 33 bears against the sides of liner disc 27 to maintain the disc in fixed relation to end wall 34 even when the closure is not on a container.

Further illustrative of the present invention is the following example:

EXAMPLE

A suitable polymer composition may be selected from the following Table I.

TABLE I.

POLYMER COMPOSITIONS

| Parts by Weight | Specific Example[1], Parts by Weight | Material | Exemplary Product |
| --- | --- | --- | --- |
| 100 | 100 | PVC[2] homopolymer or copolymer[3] resin of .7 to 1.3, preferably 1 to 1.1, inherent viscosity[4] | B. F. Goodrich G-92 or General Tire Vygen 310 |
| 50–70 | 62 | Dioctyl phthlate | |
| 20–30 | 20 | Inert filler, e.g. precipitated $CaCO_3$ or clay | Pluess-Staufer Omya Blo-3 $CaCO_3$ |
| 1–3 | 2 | Titanium dioxide | Dupont Ti-Pure R-100 |
| .5–2.0 | 1.4 | Calcium Zinc Stabilizer | Ferro-Chemical 6007 |
| .5–1.2 | .8 | Blowing Agent, e.g. Azodicarbonamide or N-Nitroso-compounds | Kempore 200 of National Polychemical, Inc. |

[1]This specific example uses the products listed in the column, Exemplary Product, the only exception being dioctyl phthlate, which is a readily available chemical substance.
[2]Polyvinyl chloride
[3]Vinyl chloride/vinylacetate copolymer with 86 to 92% by weight vinyl chloride, 8 to 14% by weight vinyl acetate.
[4]ASTM 1755-66

In the above composition, the dioctyl phthlate is a plasticizer and contributes to the relative hardness or softness of the final product. The titanium dioxide contributes to the color of the final product and represents an additional amount of filler. The calcium zinc stabilizer meets FDA regulations for products to be in contact with foods.

The above composition is mixed in a high intensity, i.e. high shear and high velocity, mixer, with the resins being introduced first, the liquids next, and finally the dry additives. The mixing is conventional, the idea being to obtain a chemically uniform and complete coating of every resin and additive particle.

The mixed polymer composition is then loaded into extruder 1 of inner barrel diameter equals 4½ inches and forwarded in the extruder by feed screw 5. The polyvinyl chloride extrusion screw with a compression ratio in a range of 2.9:1 to 3.5:1, specifically 3.14:1, plasticates the composition. Constant taper head 4 and die 6 are used to give a smooth, non-turbulent flow of molten polyvinyl chloride composition from the extrusion barrel to the outside of the die. The die 6 has a land width in a range 3/16 to 5/16, specifically ¼, of an inch in the direction of extrudate flow.

The polymer composition is extruded in ribbon or sheet form and is suspended on roller mechanism 7 located ½ to 4 inches from the die lip at the outlet of die 6. The molten plastic expands to the desired density due to the evolution of $N_2$ gas while supported in the air space by means of roller mechanism 7. Head pressure at the end of screw 5 is maintained between 800 and 1500, specifically 800, pounds per square inch.

The thickness of the polymer composition ribbon as it leaves die 6 lies between .030 and .050 inch in the specific example. A drawdown or reduction in cross section of the ribbon of about 20% may be effected by appropriate adjustment of the rotational speed of winding mechanism 19. Thus the ribbon extrudate exiting from die 6 may have a width of 3½ inches and yet give a final product width of 2¾ inches. Land width in the direction of ribbon flow is ¼ inch in die 6 in the specific example. The ribbon speed is 175 feet per minute and path length of the ribbon between the outlet of die 6 and point 14 where the ribbon enters the water is between 10 and 12 inches. Bar 20 lies about 8 inches below the surface 10 of the water, and the ribbon legs on either side of bar 20 as vertex in FIG. 1 enclose an angle of 110°, i.e. angle $\alpha$ in FIG. 1 equals 70°. The length of the tank 12 left and right in FIG. 1 is 10 feet. Water enters at connection 15 with a temperature of about 60°F and flows countercurrent to the bitton flow thus rising in temperature until at overflow 16 the water temperature is 75° to 85°F.

The temperature of the molten polymer mixture at the end of feed screw 5 is maintained in the 345° to 385°F range, specifically 360°F. Conventional take-off and wind-up equipment are used to wind up the coils of expanded stock. Extruders other than the 4 ½ inch size used in the present example will have different settings but the details of this example will allow those in the art to make heat and pressure adjustments on their equipment for obtaining equivalent results.

It will be understood that the above description of the present invention is susceptible to various modifications, changes, and adaptations and the same are intended to be comprehended within the meaning and range of equivalents of the appended claims.

What is claimed is:

1. A method of producing a foamed plastics product suitable as liner material for container closures, including the steps of extruding a molten polymer composition foamable at atmospheric pressure into an air space at atmospheric pressure and then into a liquid quenching agent for stopping foaming and for setting the composition, and wiping against the quenched composition, wherein the improvement comprises the step of maintaining the residence time of the composition in the air space as a function of bubbling from the composition during wiping.

2. A method as claimed in claim 1 wherein the polymer component of said composition consists essentially of polyvinyl chloride.

* * * * *

UNITED STATES PATENT OFFICE
CERTIFICATE OF CORRECTION

PATENT NO. : 3,907,953
DATED : September 23, 1975
INVENTOR(S) : William R. Wheeler It is certified that error appears in the above-identified patent and that said Letters Patent are hereby corrected as shown below:

Col. 1, line 39 — After "foam" change "linear" to --liner--.

Table I, under "Exemplary Product", line 4 — Change "Blo-3" to --Blr-3--.

Col. 6, line 34 — After "the" change "bitton" to --ribbon--.

Signed and Sealed this ninth Day of December 1975

[SEAL]

Attest:

RUTH C. MASON
Attesting Officer

C. MARSHALL DANN
Commissioner of Patents and Trademarks